(12) United States Patent
Attar et al.

(10) Patent No.: US 9,223,592 B2
(45) Date of Patent: Dec. 29, 2015

(54) CONFIGURING A SYSTEM WITH VARIOUS SYSTEM COMPONENTS UTILIZING A CONFIGURATION PROFILE

(75) Inventors: Mohammed M. Attar, Placentia, CA (US); William B. Lobig, Trabuco Canyon, CA (US); Paul S. MacAlpine, Laguna Hills, CA (US); Lauren A. Mayes, Laguna Beach, CA (US); Raghuram Tadipatri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 13/570,886

(22) Filed: Aug. 9, 2012

(65) Prior Publication Data

US 2014/0047228 A1     Feb. 13, 2014

(51) Int. Cl.
    *G06F 15/177*     (2006.01)
    *G06F 15/173*     (2006.01)
    *G06F 9/445*     (2006.01)

(52) U.S. Cl.
    CPC ................................. *G06F 9/44505* (2013.01)

(58) Field of Classification Search
    CPC ... G06F 8/60; G06F 9/44505; H04L 41/0813; H04L 67/34
    USPC ............. 709/221, 225, 226; 726/25; 717/121; 714/5; 706/11
    See application file for complete search history.

(56) References Cited

U.S. PATENT DOCUMENTS

| | | | |
|---|---|---|---|
| 5,950,001 A | 9/1999 | Hamilton et al. | |
| 6,301,707 B1 | 10/2001 | Carroll et al. | |
| 6,785,689 B1 | 8/2004 | Daniel et al. | |
| 7,526,457 B2 * | 4/2009 | Duevel et al. | 706/11 |
| 7,735,080 B2 | 6/2010 | Barturen et al. | |
| 7,831,959 B1 | 11/2010 | Perry et al. | |
| 8,127,268 B2 * | 2/2012 | Fernandez-Ivern et al. | 717/101 |
| 8,141,041 B2 | 3/2012 | Williamson | |
| 8,266,617 B2 | 9/2012 | Pichetti et al. | |
| 8,291,405 B2 | 10/2012 | Buckley et al. | |
| 8,302,077 B2 * | 10/2012 | Manczak et al. | 717/121 |
| 8,359,390 B2 * | 1/2013 | Cupit | 709/226 |
| 8,407,662 B2 | 3/2013 | Lam | |

(Continued)

OTHER PUBLICATIONS

IBM, "Method to Create Clone-able Software Installations", IP.com, IPCOM000159119D, Oct. 8, 2007, 7 pages.

*Primary Examiner* — Quang N Nguyen
(74) *Attorney, Agent, or Firm* — Jeanine Ray; Edell, Shapiro & Finnan, LLC

(57) ABSTRACT

According to an embodiment of the present invention, a computer system for configuring a system with at least two different system components based on a target computing environment includes at least one processor. The computer system generates a profile to configure each of the different system components for the target computing environment. The profile identifies the corresponding tasks to be performed and properties to configure each of the different system components for the target computing environment. The computer system processes the profile and performs the tasks in the order listed in the profile and in accordance with the properties to configure the system for the target computing environment. Embodiments of the present invention further include a method and computer program product for configuring a system with at least two different system components based on a target computing environment in substantially the same manner described above.

21 Claims, 15 Drawing Sheets

(56) References Cited

U.S. PATENT DOCUMENTS

| | | |
|---|---|---|
| 2003/0078908 A1 | 4/2003 | Paransky |
| 2004/0181779 A1 | 9/2004 | Gorti |
| 2005/0273717 A1 | 12/2005 | Breeden et al. |
| 2006/0075102 A1* | 4/2006 | Cupit .......................... 709/225 |
| 2006/0161895 A1 | 7/2006 | Speeter et al. |
| 2006/0165123 A1 | 7/2006 | Jerrard-Dunne et al. |
| 2007/0078873 A1 | 4/2007 | Avinash et al. |
| 2008/0127093 A1* | 5/2008 | Fernandez-Ivern et al. .. 717/124 |
| 2009/0150882 A1 | 6/2009 | Dechovich |
| 2009/0222429 A1 | 9/2009 | Aizenbud-Reshef |
| 2010/0005451 A1 | 1/2010 | Hirose et al. |
| 2010/0071066 A1* | 3/2010 | Kline et al. ..................... 726/25 |
| 2010/0114816 A1 | 5/2010 | Kiilerich |
| 2010/0192006 A1* | 7/2010 | Gharat et al. ..................... 714/5 |
| 2010/0235813 A1 | 9/2010 | Manczak et al. |
| 2011/0078673 A1 | 3/2011 | Muckenhuber |
| 2012/0204149 A1 | 8/2012 | Joukov et al. |
| 2013/0174129 A1 | 7/2013 | Grammel et al. |
| 2013/0198349 A1* | 8/2013 | Wright et al. ................. 709/221 |
| 2013/0332899 A1 | 12/2013 | Stewart et al. |
| 2014/0047414 A1 | 2/2014 | Attar |

* cited by examiner

```
<?xml version="1.0" encoding="UTF-8"?><profile name="*profile
name*" typeid="*unique identifier for profile type*">
<tasks>
<task symbolicname="*symbolic name*" typeid="*unique
 identifier for task type*"/>
...
</tasks>
</profile>
```

FIG.2A

```
<?xml version="1.0" encoding="UTF-8"?><configuration
description="*task description*" displayName="*task display
name*" enabled="true" implementorid="*unique identifier for
implementation*">
  <property name="*Property Symbolic name*">
    <value>*Property value*</value>
    <description>*Property description*</description>
    <displayName>*Property display
      name*</displayName>
  </property>
</configuration>
```

FIG.2B

```
<?xml version="1.0" encoding="UTF-8"?><configuration
displayName="*environment display name*" enabled="true"
 implementorid="*unique identifier for implementation*">
  <property name="*Property Symbolic name*">
    <value>*Property value*</value>
    <description>*Property description*</description>
    <displayName>*Property display
      name*</displayName>
  </property>
</configuration>
```

FIG.2C

CONFIGURING A SYSTEM WITH VARIOUS SYSTEM COMPONENTS UTILIZING A CONFIGURATION PROFILE

BACKGROUND

1. Technical Field

Present invention embodiments relate to system configuration, and more specifically, to configuring software systems with various software components utilizing a configuration profile.

2. Discussion of the Related Art

In order to configure a heterogeneous software system containing different software components, each software component must typically be configured independently. This is accomplished either through performance of a series of manual steps, or with use of a tool. Tools for configuration of software components generally focus on a specific component within a potentially heterogeneous software system, and utilize a wizard format (e.g., a series of graphical user interface (GUI) screens) to perform the product configuration. Since the wizard format traverses a configuration from beginning to end, a user has difficulty terminating the wizard prior to completion and subsequently continuing from the point of the termination (without traversing through the previously navigated portions of the wizard). Further, the wizard format does not enable steps in the component configuration process to be skipped when these steps were performed manually, or as a part of configuring a different component of the software system.

Thus, extraneous tools are used to configure a software system since each component of the software system is associated with a corresponding tool. In the absence of a tool, manual steps must be followed that can be tedious and error prone when repeated for configuring multiple instances of a software system. The usefulness of the tools become negatively impacted when the tools do not allow users to perform the required steps for the configuration. Even when a tool does allow for configuration of different heterogeneous software components, the configuration steps are separated into different parts of the tool, thereby requiring the user to typically configure one software component at a time. When software components are codependent and interleave configuration steps, this interleaving is significantly complex. In this case, the user manually switches between different parts of the tool for the configuration, thereby leading to errors in execution of the correct sequence of configuration steps for the different software components.

Profiles have been introduced that decompose configuration steps into tasks that are independently performed. However, each profile focuses on a specific component of the overall software system, where interleaving of tasks is difficult. Further, configuration steps exist that need to be performed for various components depending on the nature of the system as a development environment (e.g., created for development work) or a production environment (e.g., a system for final deployment in production). Moreover, the same parameters may need different values for these environment types. Current tools for configuring an environment do not holistically configure a software system nor distinguish between configuring a system providing a development environment and a system providing a production environment.

BRIEF SUMMARY

According to one embodiment of the present invention, a computer system for configuring a system with at least two different system components based on a target computing environment includes at least one processor. The computer system generates a profile to configure each of the different system components for the target computing environment. The profile identifies the corresponding tasks to be performed and properties to configure each of the different system components for the target computing environment. The computer system processes the profile and performs the tasks in the order listed in the profile and in accordance with the properties to configure the system for the target computing environment. Embodiments of the present invention further include a method and computer program product for configuring a system with at least two different system components based on a target computing environment in substantially the same manner described above.

BRIEF DESCRIPTION OF THE SEVERAL VIEWS OF THE DRAWINGS

FIG. 2A is an example of a configuration file maintaining tasks and their corresponding ordering for a configuration profile according to an embodiment of the present invention.

FIG. 2B is an example of a task property file maintaining task properties for a task of a configuration profile according to an embodiment of the present invention.

FIG. 2C is an example of a profile property file maintaining profile properties for a configuration profile according to an embodiment of the present invention.

DETAILED DESCRIPTION

Present invention embodiments pertain to creating, managing, and executing configuration profiles utilized to configure a software system including various software components. This may be accomplished by a configuration tool of present invention embodiments. A configuration profile includes a collection of tasks, and properties of the tasks and associated environments for configuring various software components of a software system. The configuration may be based on the implementation of the software system as a development environment (e.g., including a test environment) or a production environment. A single configuration profile is created for an entire software system, thereby rendering the sequence of configuration tasks obvious and intuitive. The configuration tool enables an administrator or user configuring the software system to execute tasks of the configuration profile in the order the tasks are indicated in the configuration profile, thereby greatly simplifying configuration and reducing confusion of the proper configuration procedure.

Figure 1:
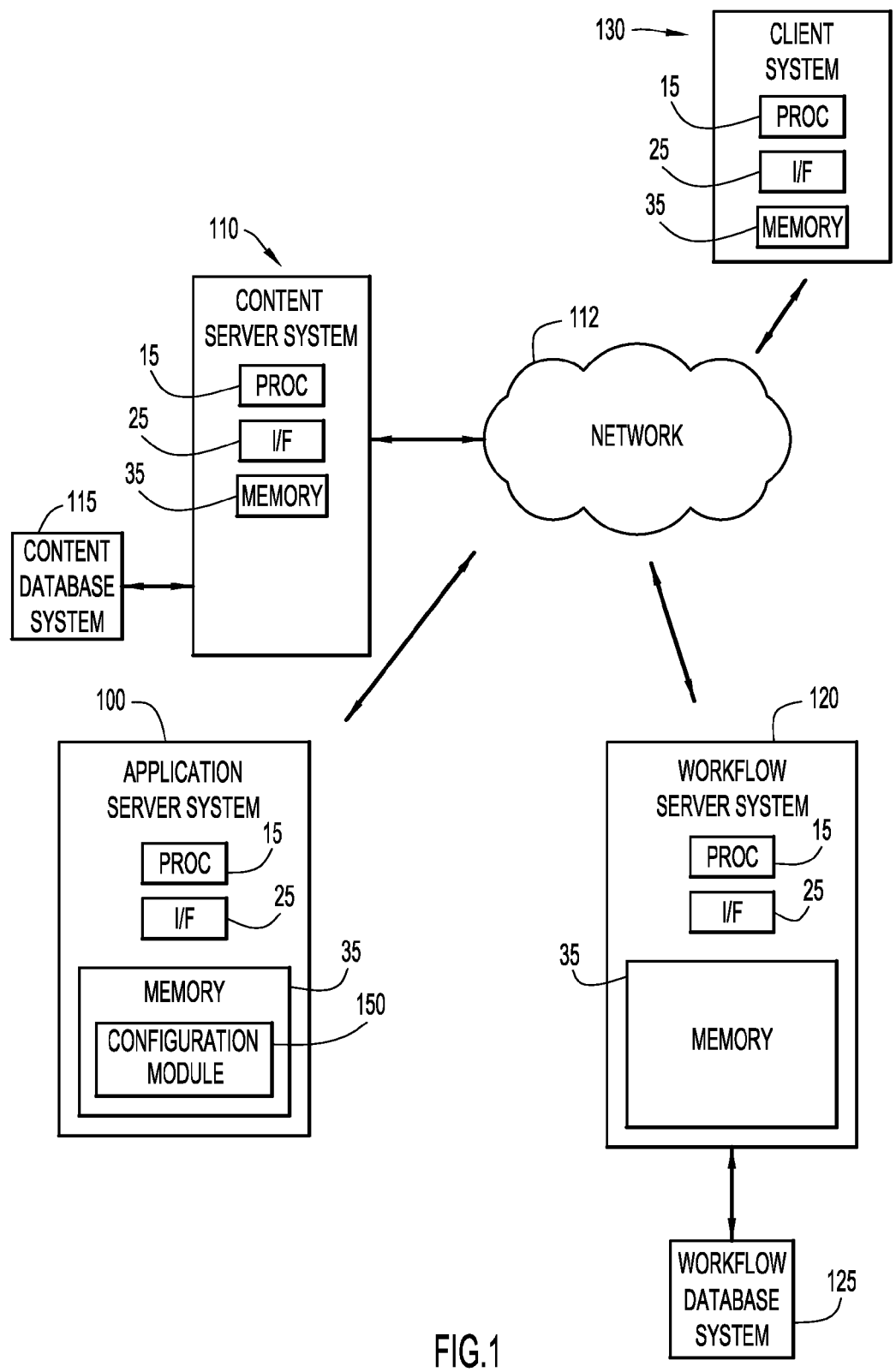
FIG. 1 is a diagrammatic illustration of an example computing environment for use with an embodiment of the present invention.

An example computing environment for use with a present invention embodiment is illustrated in FIG. 1. In particular, a computing environment includes an application server system 100, a content server system 110, a workflow server system 120, and one or more client systems 130. The server systems may be physical server systems, or be implemented as virtual server systems residing on the same physical machine or on two or more different physical machines. A configuration profile may be utilized to configure the software components of the application server system, content server system, and/or workflow server system as described below.

Server systems 100, 110, 120 and client system 130 may be remote from each other and communicate over a network 112. The network may be implemented by any number of any suitable communications media (e.g., wide area network (WAN), local area network (LAN), Internet, Intranet, etc.). Alternatively, server systems 100, 110, 120 and client system 130 may be local to each other, and communicate via any appropriate local communication medium (e.g., local area network (LAN), hardwire, wireless link, Intranet, etc.).

Content server system 110 implements a content management system, and manages content or information. The content or information may be stored in a content database system 115. The content database system may be implemented by any conventional or other database or storage unit, may be local to or remote from content server system 110, and may communicate via any appropriate communication medium (e.g., local area network (LAN), wide area network (WAN), Internet, hardwire, wireless link, Intranet, etc.). By way of example only, the content server system may be implemented by an IBM FileNet P8 Content Engine alone or in combination with IBM Content Manager.

Workflow server system 120 performs business processes or workflows on content or information from the content server system. A workflow database system 125 stores information pertaining to the processing of the workflows. The workflow database system may be implemented by any conventional or other database or storage unit, may be local to or remote from workflow server system 120, and may communicate via any appropriate communication medium (e.g., local area network (LAN), wide area network (WAN), Internet, hardwire, wireless link, Intranet, etc.). By way of example only, the workflow server system may be implemented by an IBM FileNet P8 Process Engine alone or in combination with IBM Business Process Manager.

Application server system 100 provides various applications to process information from or for the content and/or workflow server systems. The application server system includes a configuration module 150 that implements the configuration tool for creating, managing, and executing configuration profiles to configure software components of a software system as described below. By way of example only, the application server system may be implemented by an IBM WebSphere Application Server with a configuration profile augmented by IBM Business Space.

Client systems 130 may present a graphical user (e.g., GUI, etc.) or other interface of the configuration tool (e.g., command line prompts, menu screens, etc.) to solicit information from users pertaining to the desired configuration, and may provide reports or displays including various information.

Server systems 100, 110, 120 and client system 130 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, client/communications/browser software, applications, configuration module, etc.).

Configuration module 150 may include one or more modules or units to perform the various functions of present invention embodiments described below. The various modules (e.g., configuration module, etc.) may be implemented by any combination of any quantity of software and/or hardware modules or units, and may reside within memory 35 of application server system 100 for execution by processor 15.

A configuration profile includes a series of tasks or activities to be performed in order to configure various software components of a software system (e.g., application server system 100, content server system 110, and/or workflow server system 120 of FIG. 1). The tasks of a configuration profile use a shared set of environment properties. Profile properties include properties associated with a configuration profile. These types of properties may include environment properties pertaining to an associated environment (e.g., application server system (e.g., IBM WebSphere Application Server (WAS), etc.) properties, content engine/server system properties, etc.). Profile properties are common to a large quantity of tasks in a profile.

A task includes a configuration activity to perform, and is associated with a collection of task properties required for completion of the configuration activity. A task may further use other properties that are stored in the configuration profile from performance of a configuration activity. A task may be executed, where the task execution may fail or be successful. Moreover, tasks may include a test feature to verify that entered task and/or environment properties are valid before executing a task.

Profile and task properties are each associated with a text field in a configuration profile that receives information entered by a user. Profile and task properties may alternatively employ a drop-down menu or list to enable selection of property information by a user.

A configuration profile is typically implemented as a folder with extensible markup language (XML) files for task and profile properties. Plural profile property files may be used, where each profile property file specifies the profile properties for a different software component (e.g., application server (e.g., WebSphere Application Server (WAS), etc.) properties, content engine/server system properties, etc.). In addition, an extensible markup language (XML) configuration file specifies the name and type of the configuration profile, and the name and types of tasks in the configuration profile. The ordering of tasks in the configuration file indicates the order of execution of those tasks for configuring the software system.

An example of a configuration file maintaining tasks within a configuration profile is illustrated in FIG. 2A. Specifically, a configuration file 200 includes a configuration profile name field 202, a configuration profile type identification field 204, and one or more task sections 205. Configuration profile name field 202 includes a user defined configuration profile name, where the directory folder that contains the configuration profile and the file itself typically have the same name as the configuration profile. Configuration profile type identification field 204 includes a unique string identifying the configuration profile type. For example, a configuration profile type identification may include a package name and class name for a JAVA class that implements the configuration profile type.

Each task section 205 is associated with a corresponding task and includes a task symbolic name field 206, and a task type identification field 208. Task symbolic name field 206 includes a unique name for the corresponding task. The symbolic name may further serve as the name of the file containing properties for that task. If more than one copy of a given task type exists, subsequent copies include an additional identifier (e.g., period and version number) to uniquely identify the task. For example, three copies of a task 'configcmos' may be present, where a second copy of the task includes the symbolic name 'configcmos.2' to indicate that the task is represented by the file configcmos.2.xml. Task type identification field 208 includes a unique string to identify the task type (e.g., a package name and the symbolic name for a JAVA class that implements the task type). The ordering of tasks (or task sections 205) within the configuration file indicates the order of execution of those tasks to configure the software system.

Task and profile properties are typically represented by extensible markup language (XML) files indicating these properties. The files related to a configuration profile (e.g., profile property files, task property files, etc.) preferably reside in the same directory as the configuration file. An example of a task property file maintaining properties of a corresponding task is illustrated in FIG. 2B. A configuration profile typically includes a task property file for each task. Specifically, a task property file 220 includes a configuration description field 222, a display name field 224, an enable flag field 226, an implementor identification field 228, and one or more task property sections 230. Configuration description field 222 includes a description used for the task that is displayed by the configuration tool of present invention embodiments (e.g., FIGS. 4F, 5A-5C, and 6A-6C), and may be translated to the language spoken in the locale of a user. Display name field 224 includes a name for the task that is displayed by the configuration tool of present invention embodiments or on a command line, and may be translated to the language spoken in the locale of a user. Enable flag field 226 includes a flag that indicates a status of the task as enabled or disabled. Disabled tasks cannot be executed until enabled, and are not executed when executing all tasks in a profile. Implementor identification field 228 includes a unique string indicating the type of implementation environment represented by the file. This is useful information since task types may have different implementations. For example, a task implementation may be for a standard deployment (e.g., one unmanaged node) (e.g., FIG. 5B), a network deployment (e.g., one node managed by a deployment manager node), or a cluster deployment (e.g., plural nodes managed by a deployment manager node) (FIG. 5C). In addition, there may be various implementations (e.g., IBM DB2, ORACLE, MICROSOFT SQL, etc.), where each implementation may include a different set of properties and some properties may be needed only for specific implementations. By way of example, performance of a standard implementation of a task needs information pertaining to a server node, a server name, and a virtual host, while performance of a cluster implementation of the task needs information pertaining to a cluster name and virtual host.

Task property sections 230 each include a task property name field 232, a task property value field 234, a task property description field 236, and a task property display name field 238. Task property name field 232 includes the symbolic name uniquely identifying a task property type. Task property value field 234 includes a value of the task property. Task property description field 236 includes a string that provides information pertaining to the purpose of the task property and the type of expected values. The description is displayed by the configuration tool of present invention embodiments, and may be translated to the language spoken in the locale of a user. Task property display name field 238 includes a name for the task property that is displayed by the configuration tool of present invention embodiments, and may be translated to the language spoken in the locale of the user.

In addition, a status folder is employed that contains files for tracking the status of executed tasks. If a task has been executed successfully, the status folder includes a file with the same symbolic name of that task and a suffix indicating the successful execution (e.g., '.ok'). When the task is currently executing, the status folder includes a file with the same symbolic name of that task and a suffix indicating the current execution (e.g., '.running'). If the task has been executed and failed, the status folder includes a file with the same symbolic name of that task and a suffix indicating the failed execution (e.g., '.failed') and the exception related to the failed execution.

An example of a profile property file maintaining various profile properties including those related to an environment is illustrated in FIG. 2C. A profile property file includes substantially the same format as the task property file described above, except that the implementor identification field tracks the type of profile properties maintained by the file (e.g., properties for the application server system (e.g., WebSphere Application Server (WAS), etc.) and content engine/server system), the configuration description field is absent, and the enable flag field includes a flag with a value preventing disablement of profile properties. Specifically, a profile property file 250 includes a profile property display name field 252, an enable flag field 254, an implementor identification field 256, and one or more profile property sections 260. Profile property display name field 252 includes a name for the property (or environment) that is displayed by the configuration tool of present invention embodiments or on a command line, and may be translated to a language spoken in the locale of the user. Enable flag field 254 includes a flag that indicates the profile properties as enabled or disabled. However, since an embodiment of the present invention does not allow profile properties to be disabled, the flag is typically set to enable the profile properties. Implementor identification field 256 includes a unique string that indicates the type of environment implementation represented by the profile property file. This field is typically utilized for tasks as described above.

Profile property sections 260 each include a profile property name field 262, a profile property value field 264, a profile property description field 266, and a profile property display name field 268. Profile property name field 262 includes the symbolic name uniquely identifying a profile property type. Profile property value field 264 includes a value of the profile property. Profile property description field 266 includes a string that provides information pertaining to the purpose of the profile property and the type of expected values. The profile property description is displayed by the configuration tool of present invention embodiments, and may be translated to a language spoken in the locale of the user. Profile property display name field 268 includes a name for the profile property that is displayed by the configuration tool of present invention embodiments, and may be translated to a language spoken in the locale of the user.

Although task and profile properties may each be represented in a user interface (UI) via a variety of interface elements (e.g., a text field, drop-down menu or list, writable drop-down menu, text box, radio button, etc.), these properties are each ultimately represented by text. This allows for modification of the task and profile properties via editing of the corresponding extensible markup language (XML) files directly.

Individual configuration profiles for a system may be generated to respectively configure the system for a development environment and a production environment. The tasks within these different configuration profiles are generally substantially similar with minor differences since some tasks may be specific to one of the environment types. Further, properties may be assigned different default values based on the environment type. In addition, some tasks (even including the same properties) may have slightly different actions during execution depending on the environment type. This allows for substantially similar configuration profiles to address the specific needs of a development environment or a production environment and be immediately understandable by a user based on an understanding of one of the profiles. Further, each individual configuration profile enables a system to be configured for a desired environment (e.g., development, production, etc.).

Figure 3:
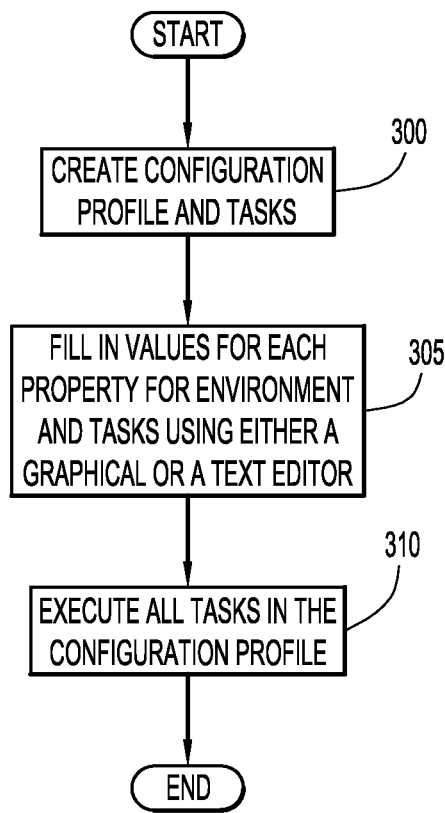
FIG. 3 is a procedural flow chart illustrating a manner in which configuration profiles are employed to configure various software components of a software system according to an embodiment of the present invention.

A manner of creating and employing a configuration profile to configure various software components of a software system (e.g., via the configuration tool of application server system 100 and configuration module 150) is illustrated in FIG. 3. Initially, a configuration profile and one or more corresponding tasks are created at step 300. This may be accomplished via the configuration tool of present invention embodiments with various user interface screens as described below (FIGS. 4A-4F), and produces a configuration file (FIG. 2A) and corresponding directory for the created configuration profile.

Information for each of the various profile and task properties associated with the created configuration profile are received from a user at step 305. This may be accomplished via user interface screens of the configuration tool of present invention embodiments as described below. The received information is utilized to produce and/or modify the profile and task property files for the configuration profile described above (FIGS. 2B and 2C). Alternatively, the configuration and task and profile property files may be created, and desired information or values for the task and profile properties may be provided and/or edited via a text editor directly modifying the configuration and task and profile property files.

Once the configuration profile has been created with the desired task and profile property information, the tasks within the configuration profile may be executed in order at step 310 to configure the software system. The tasks perform the configuration activities to configure the various components of the software system in a desired manner in accordance with the configuration profile in order to configure the software system.

A manner of creating an example configuration profile to configure software components of a software system (e.g., via the configuration tool of application server system 100 and configuration module 150) is illustrated in FIGS. 4A-4F. By way of example only, the configuration profile pertains to configuration of an example application server system 100 (e.g., IBM WebSphere Application Server) and an example content server system 110 (e.g., IBM FileNet P8 Content Engine) for a development environment. However, the configuration tool may be utilized to configure software components of any desired software system for any desired type of environment in substantially the same manner described below. A profile property file is provided for application server system 100 and content server system 110 preferably with fixed names and expected environment types. Alternatively, environments may be listed with a symbolic name for the file name and the type identification for the environment type.

The configuration tool is preferably initiated from, and displays a series of graphical user interface screens on, a client system 130 (FIG. 1) to enable creation of the configuration profile (e.g., using a remote desktop or telnet application to interface the configuration tool executing on the application server, etc.). In particular, an introductory user interface screen 400 (FIG. 4A) is displayed. Introductory screen 400 includes an information area 405 providing information pertaining to creation of configuration profiles, and a series of actuators 410 disposed toward a bottom portion of the user interface screen. Actuators 410 include a back button 412, a next button 414, a finish button 416, and a cancel button 418. Back and next buttons 412, 414 enable navigation to respective prior and subsequent user interface screens within the series. Finish button 416 terminates the session and applies user actions performed during the session to the created configuration profile, while cancel button 418 terminates the session without applying the actions to the configuration profile. Since introductory screen 400 is the initial screen in the series, back and finish buttons 412, 416 are typically disabled for this screen.

Once next button 414 is actuated from introductory screen 400, a profile information user interface screen 420 (FIG. 4B) is displayed to receive information from a user pertaining to the configuration profile. Profile information screen 420 enables a user to specify a configuration profile name, a location of the configuration profile, the configuration profile type, and options for other products to be integrated. The integration enables various tasks to be added to or removed from the configuration profile depending on the selected options. Profile information screen 420 includes a field area 425, and series of actuators 410 disposed toward a bottom portion of the profile information screen. Actuators 410 include back button 412, next button 414, finish button 416, and cancel button 418 each as described above. Field area 425 includes fields to receive information from a user pertaining to a configuration profile. By way of example, the fields include a profile type field 422, a configuration options field 424, a profile name field 426, and a profile directory field 428 with an adjacent browse actuator 429 to enable graphical selection of a directory for this field.

Profile type field 422 is associated with information pertaining to the type of environment (e.g., production or development) for the configuration profile and preferably includes radio type buttons to indicate the selection, while configuration options field 424 is associated with information pertaining to other products to integrate (e.g., IBM Content Manager, IBM Business Process Manager, etc.) with the configuration profile and preferably includes check boxes to indicate one or more selections. Profile name field 426 is associated with the name of the configuration profile, and profile directory field 428 is associated with a directory for storage of the configuration profile files described above (e.g., configuration and task and profile property files (FIGS. 2A-2C)). Since profile information screen 420 is an intermediate screen in the series, finish button 416 is typically disabled for this screen.

A development environment profile user interface screen 430 associated with profile property information for a system component is displayed (FIG. 4C) in response to actuation of back or next buttons on respective successive and prior user interface screens in the series. By way of example only, development environment profile screen 430 enables specification of profile properties for application server system 100 (FIG. 1) for a development environment.

In particular, development environment profile screen 430 includes a field area 435, and series of actuators 410 disposed toward a bottom portion of the profile information screen. Actuators 410 include back button 412, next button 414, finish button 416, and cancel button 418 each as described above. Field area 435 includes fields that receive information from a user pertaining to various profile properties. By way of example, the fields include an installation directory field 432 with an adjacent browse actuator 433 to enable graphical selection of a directory for this field, a profile directory field 434 with an adjacent browse actuator 437 to enable graphical selection of a directory for this field, an administrator user name field 436, an administrator password field 438, a host field 440, a Simple Object Access Protocol (SOAP) port field 442, and an application server cell field 444.

Installation directory field 432 is associated with information pertaining to the installation directory for the application server system, while profile directory field 434 is associated with information pertaining to a profile directory for the application server system. Administrator user name and password fields 436, 438 are respectively associated with information pertaining to the user name and password of an administrator or user of the application server system. Host field 440 is associated with information pertaining to the application server host, while Simple Object Access Protocol (SOAP) port field 440 is associated with information pertaining to the Simple Object Access Protocol (SOAP) port for the application server system. Moreover, application server cell field 444 is preferably in the form of a drop-down list and associated with information pertaining to an application server cell. The configuration tool preferably saves information received by the user for each of these fields as text to construct and/or modify a profile property file (FIG. 2C).

Figure 4A:
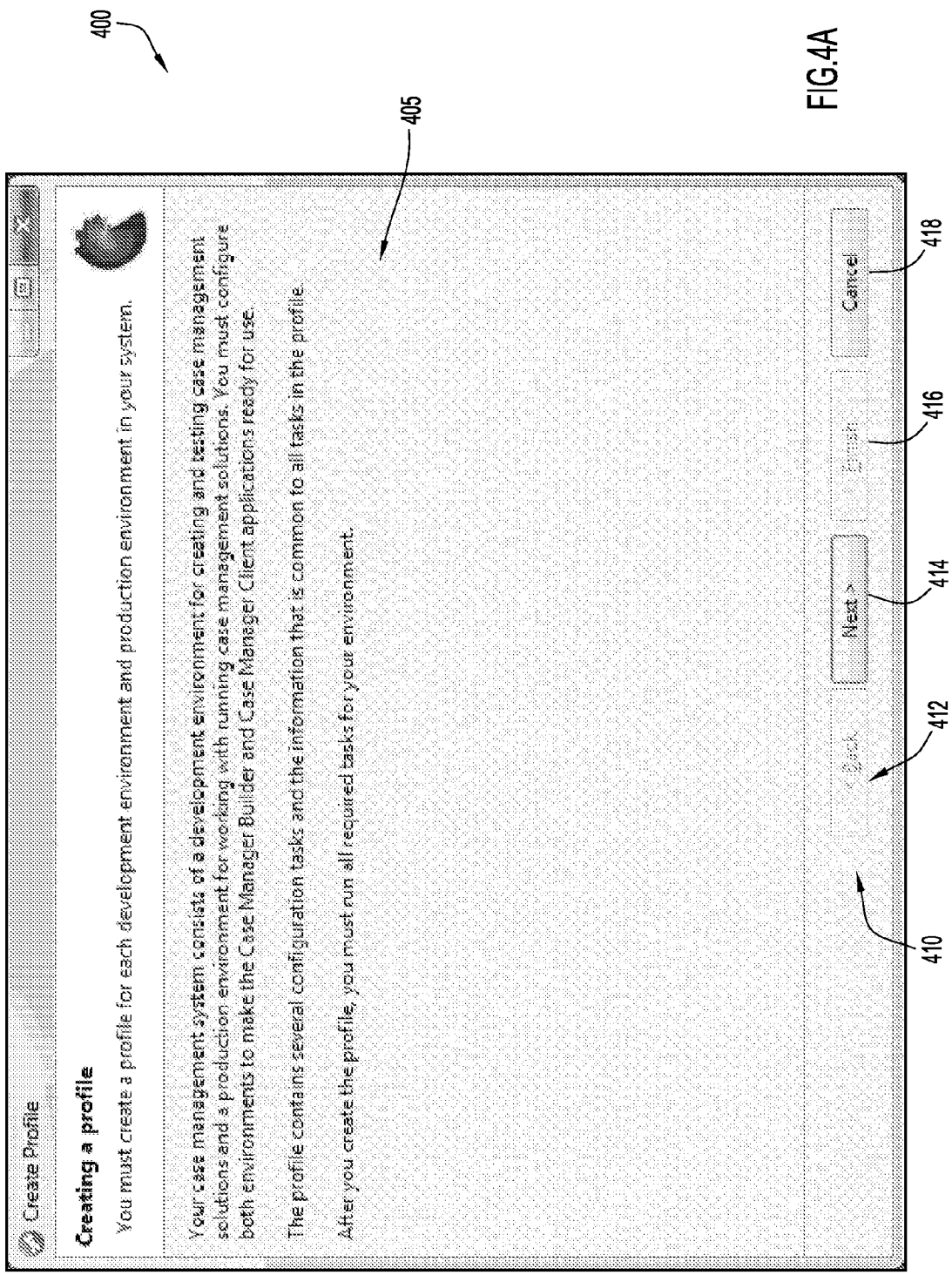
FIG. 4A is an illustration of an example graphical user interface screen for creating a configuration profile according to an embodiment of the present invention.
Figure 4B:
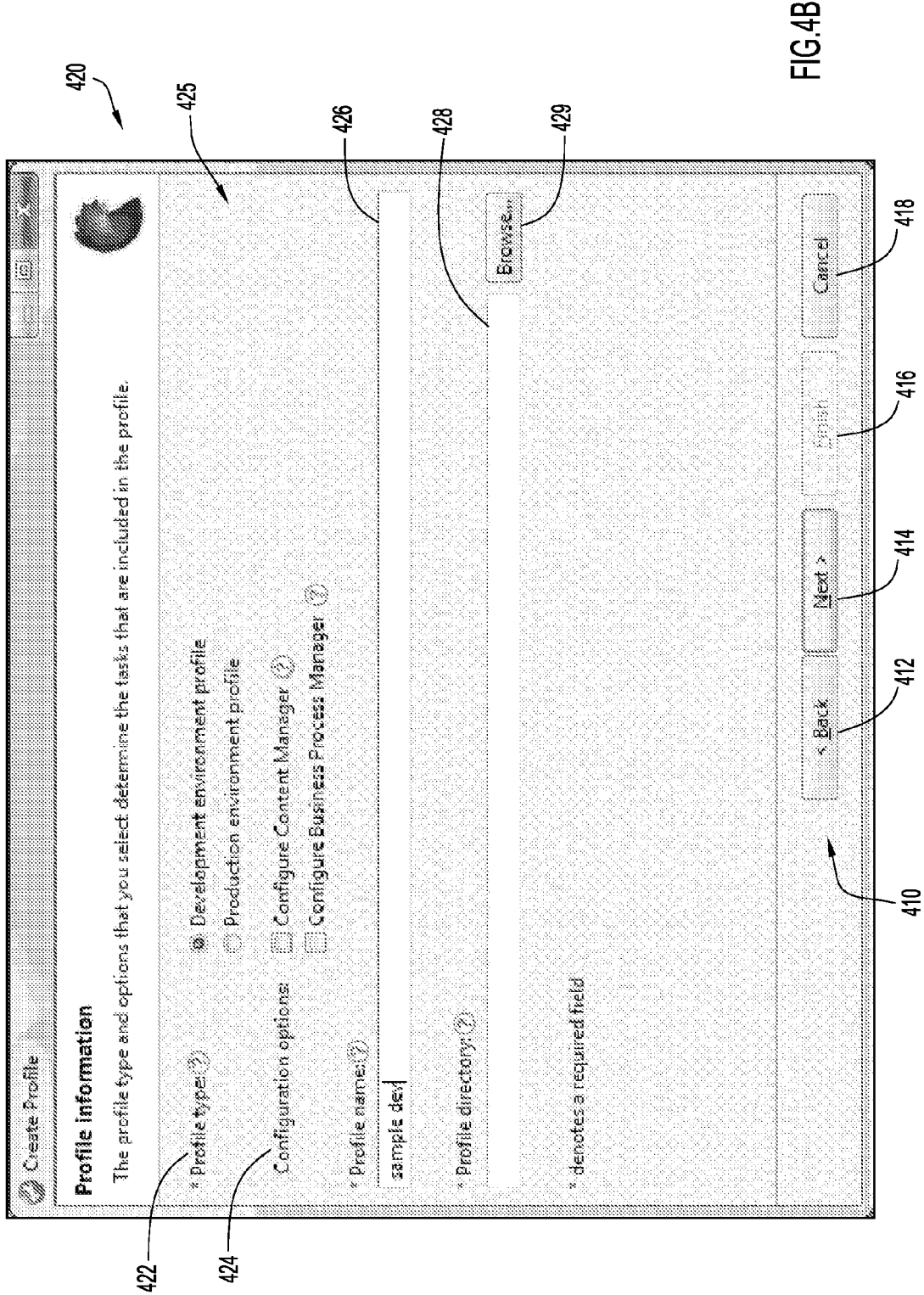
FIG. 4B is an illustration of an example graphical user interface screen with information pertaining to a configuration profile according to an embodiment of the present invention.
Figure 4C:
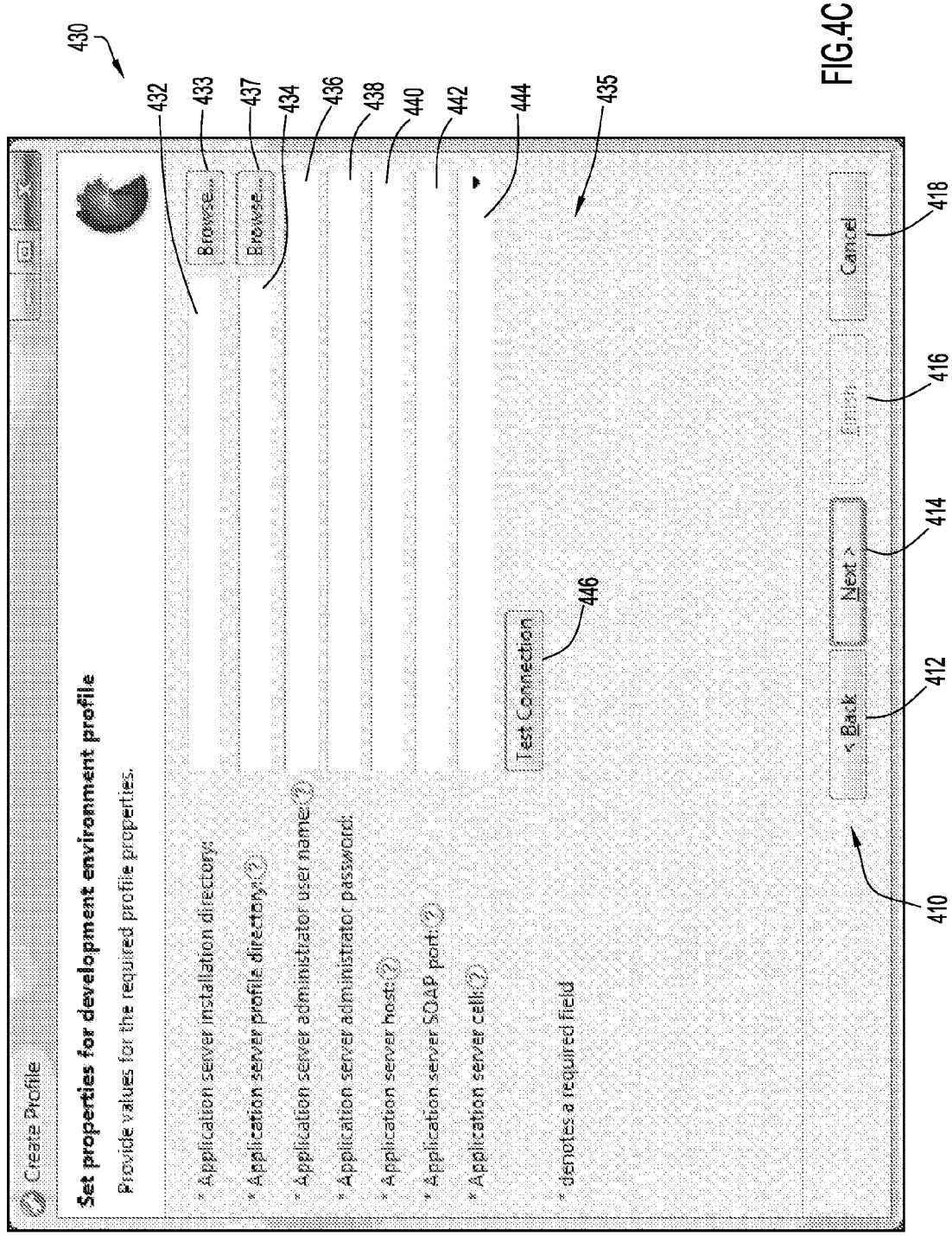
FIG. 4C is an illustration of an example graphical user interface screen with information for a configuration profile pertaining to profile properties of an application server system according to an embodiment of the present invention.
Figure 4D:
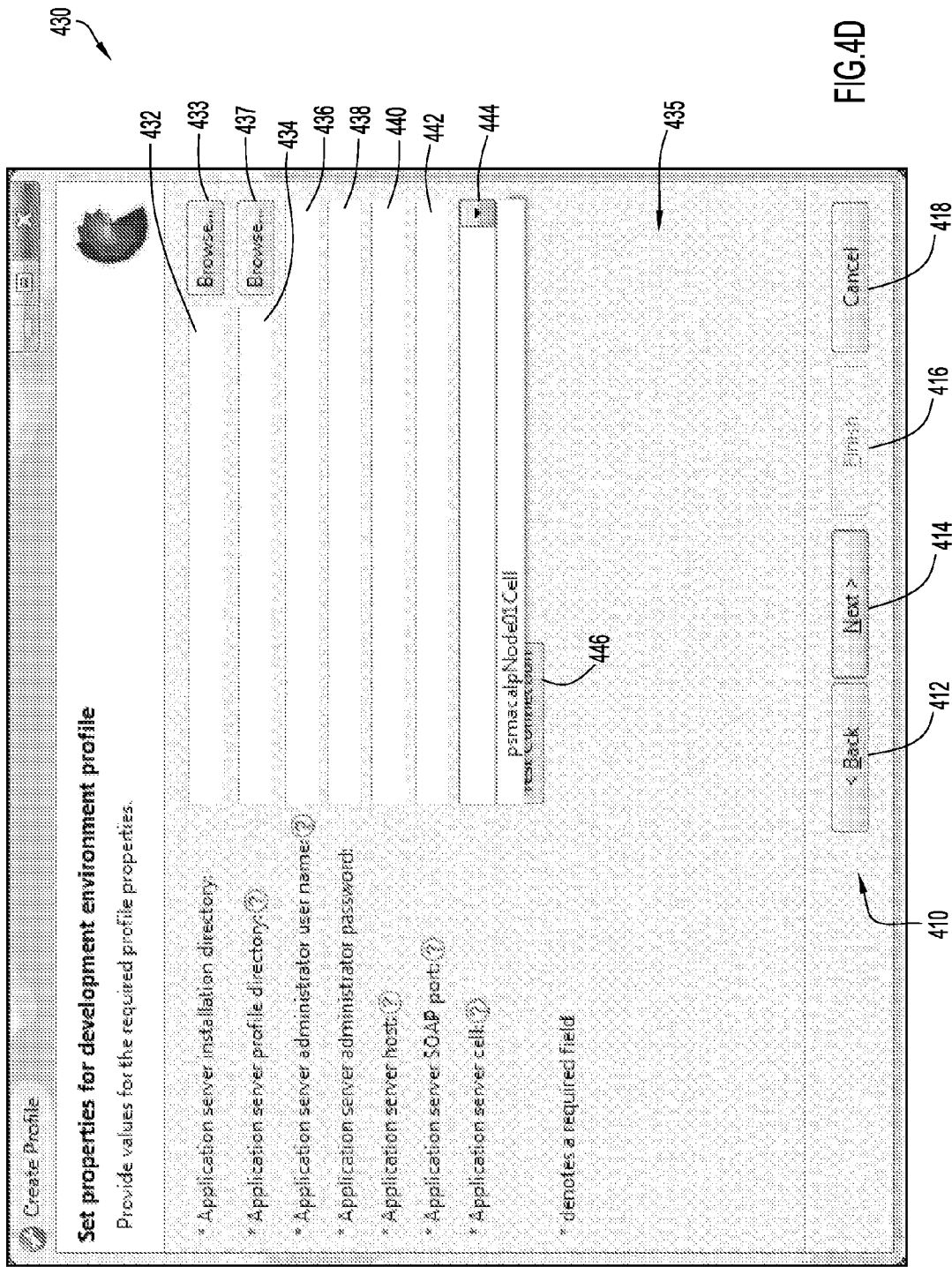
FIG. 4D is an illustration of the graphical user interface screen of FIG. 4C with selections dynamically discovered from the application server system according to an embodiment of the present invention.
Figure 4E:
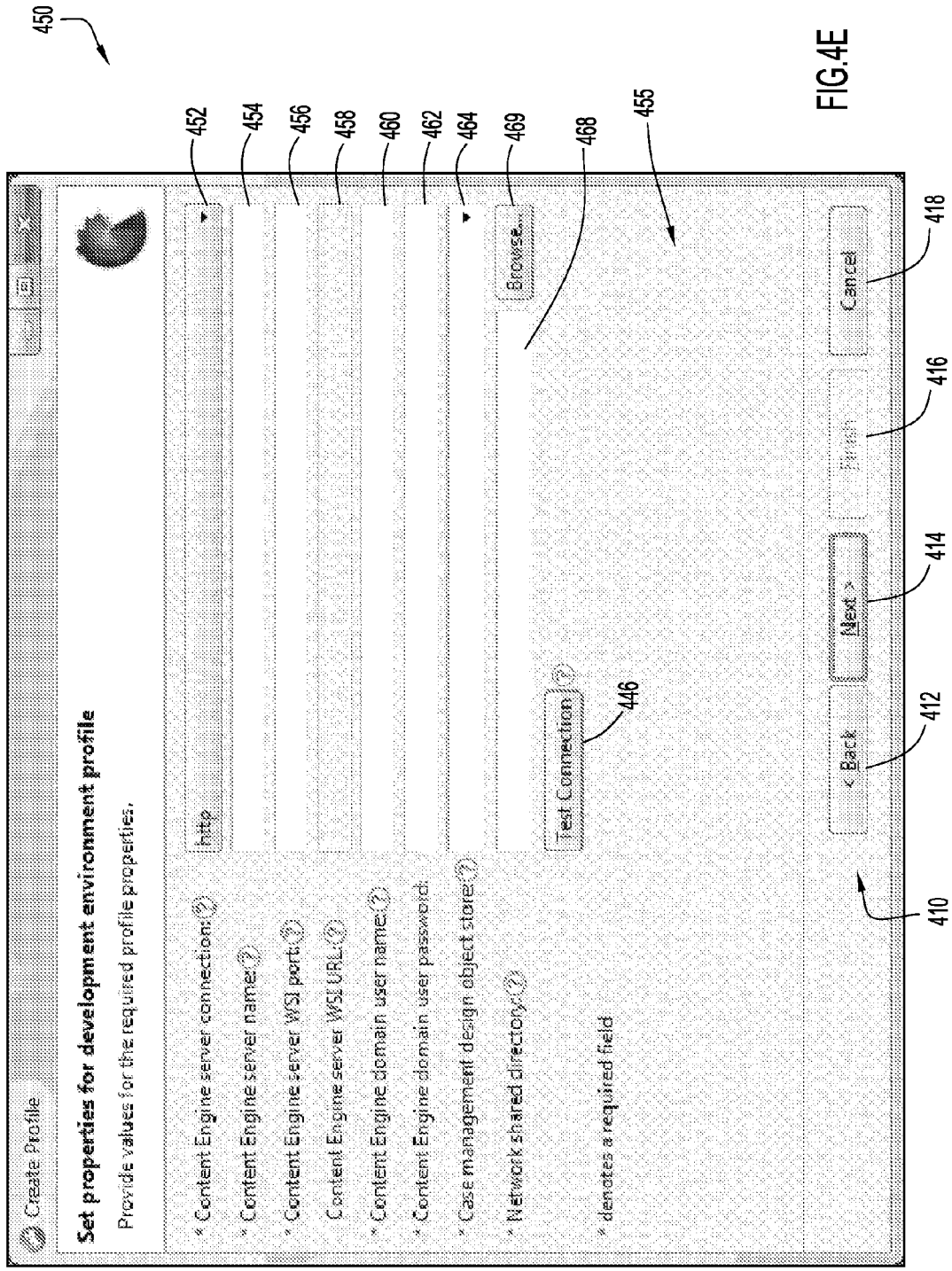
FIG. 4E is an illustration of an example graphical user interface screen with information for a configuration profile pertaining to profile properties for a content server system according to an embodiment of the present invention.

In addition, development environment profile screen 430 includes a test connection actuator 446 to test the connection to the application server system (e.g., based on the administrator user name and password provided). Further, the application server system may automatically be accessed by an application server cell based on the received profile properties (e.g., administrator user name and password) to dynamically discover selection options for the other fields. By way of example, values for a drop-down list for application server cell field 444 may be dynamically ascertained as illustrated in FIG. 4D. Since development environment profile screen 430 is an intermediate screen in the series, finish button 416 is preferably disabled for this screen.

A development environment profile user interface screen 450 for receiving profile property information for another system component is displayed (FIG. 4E) in response to actuation of back or next buttons on respective successive and prior user interface screens in the series. By way of example only, development environment profile screen 450 enables specification of profile properties for content server system 110 (FIG. 1) for a development environment.

In particular, screen 450 includes a field area 455, and series of actuators 410 disposed toward a bottom portion of the user interface screen. Actuators 410 include back button 412, next button 414, finish button 416, and cancel button 418 each as described above. Field area 455 includes fields that receive information from a user pertaining to various profile properties. By way of example, the fields include a content server connection field 452, a content server name field 454, a content server port field 456, a content server Uniform Resource Locator (URL) field 458, a content server domain user name field 460, a content server domain user password field 462, an object store field 464, and a shared directory field 468 with an adjacent browse actuator 469 to enable graphical selection of a directory for this field.

Content server connection field 452 is preferably in the form of a drop-down list and associated with information pertaining to a content server system connection, while content server name field 454 is associated with information pertaining to a content server system name. Content server port and uniform resource locator (URL) fields 456, 458 are respectively associated with information pertaining to a content server system web services interface (WSI) port and a web services interface (WSI) uniform resource locator (URL), while domain user name and password fields 460, 462 are respectively associated with information pertaining to a domain username and password for a content server system. Object store field 464 is preferably in the form of a drop-down list and associated with information pertaining to a name of an object store, while shared directory field 468 is associated with information pertaining to a network shared directory. The configuration tool preferably saves the information received from a user for each of these fields as text to construct and/or modify the profile property file (FIG. 2C).

In addition, development environment profile screen 450 includes test connection actuator 446 to test the connection to the content server system (e.g., based on the user name and password provided). Since development environment profile screen 450 is an intermediate screen in the series, finish button 416 is typically disabled for this screen.

The configuration tool may include any quantity of further user interface screens similar to the user interface screens described above for the application and content server systems to receive profile property information for configuring additional system components (e.g., workflow server system 120 (FIG. 1), etc.).

Figure 4F:
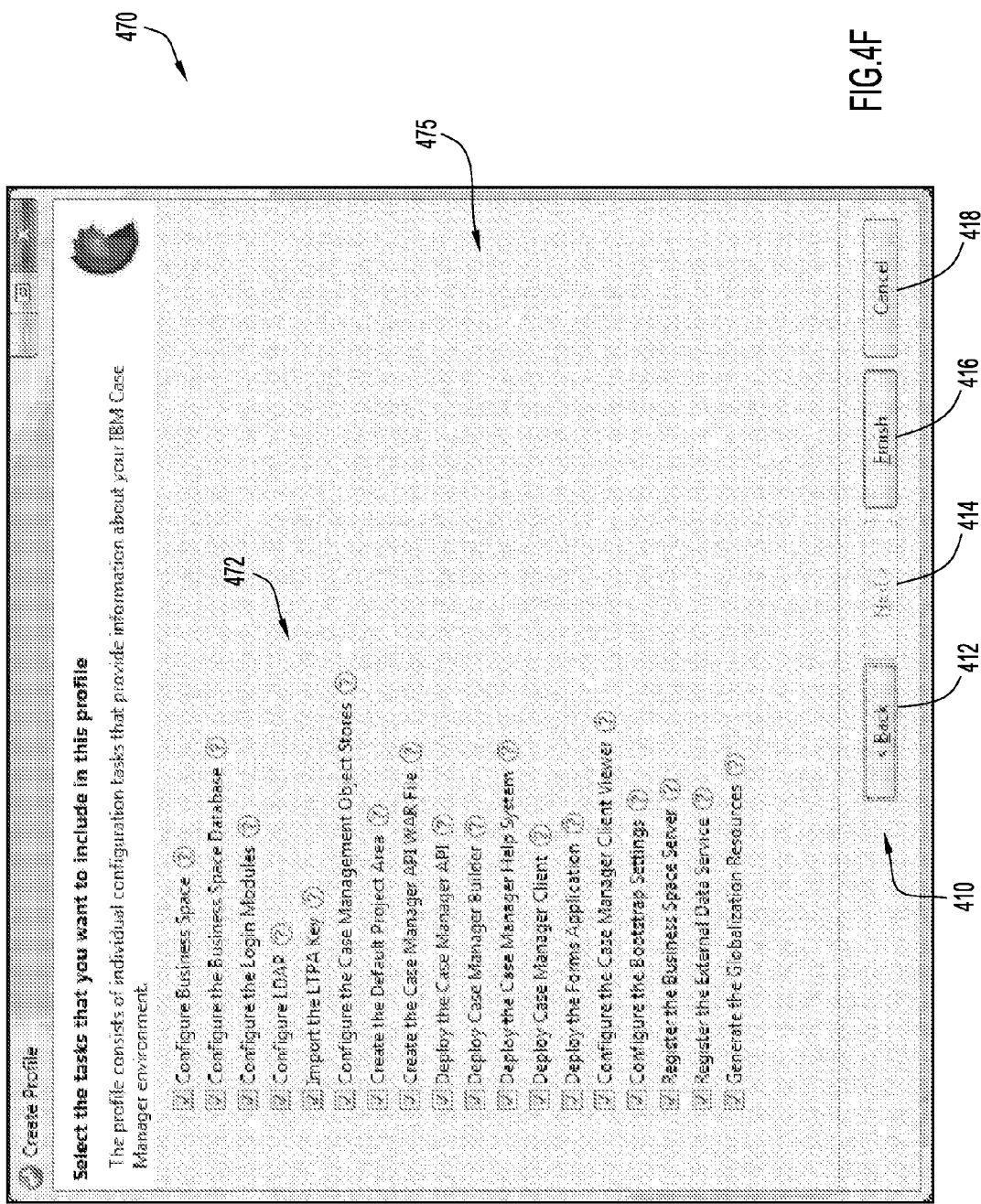
FIG. 4F is an illustration of an example graphical user interface screen enabling selection of tasks for a configuration profile according to an embodiment of the present invention.

Task information for the configuration profile indicating activities to be performed for configuration of the software system may be received via a task selection user interface screen 470 (FIG. 4F). This screen may be traversed in response to actuation of a next button on a prior user interface screen in the series. In particular, task selection screen 470 includes a field area 475, and series of actuators 410 disposed toward a bottom portion of the user interface screen. Actuators 410 include back button 412, next button 414, finish button 416, and cancel button 418 each as described above. Field area 475 includes a list of tasks 472 associated with the configuration profile (e.g., determined from the prior submitted information) and corresponding selection fields (e.g., check boxes) to enable a user to select specific tasks for the configuration profile. The tasks are typically implemented by scripts or program applications that perform corresponding activities for configuring one or more software components and/or a software system. The tasks are typically loaded into the application server system for selection. Since the task selection screen is generally the terminal user interface screen in the series, next button 414 is disabled, while finish button 414 is enabled to generate the configuration profile.

Once the information for the configuration profile has been received from a user (e.g., on the various user interface screens of FIGS. 4A-4F) and finish actuator 416 has been actuated from task selection screen 470, the configuration tool produces the appropriate files (e.g., FIGS. 2A-2C), and stores the files in the corresponding directory to generate a resulting configuration profile. Thus, the resulting configuration profile includes information to configure various system components, thereby enabling configuration of an entire system from that configuration profile.

Figure 5A:
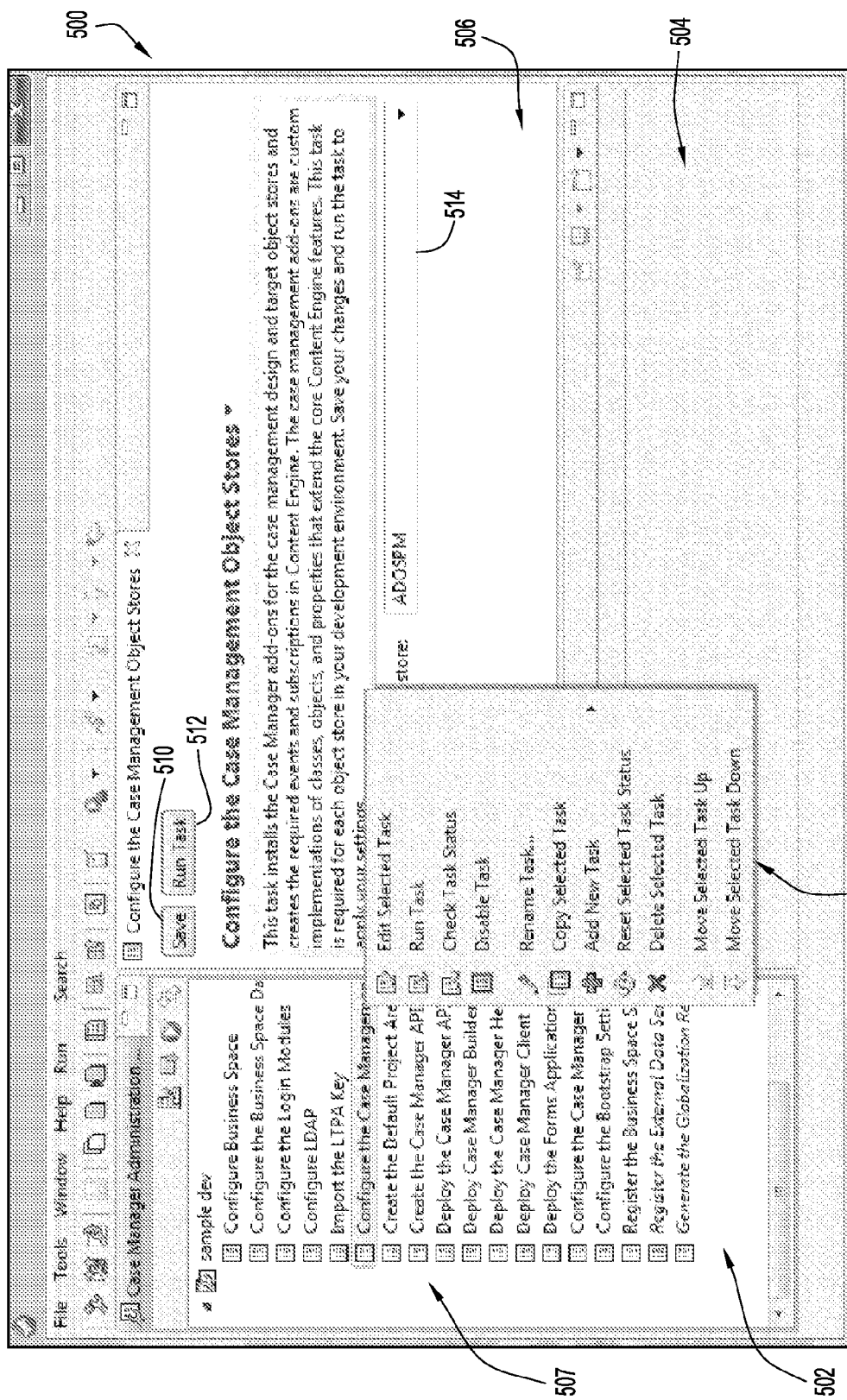
FIG. 5A is an illustration of an example graphical user interface screen for managing tasks of a configuration profile according to an embodiment of the present invention.
Figure 5B:
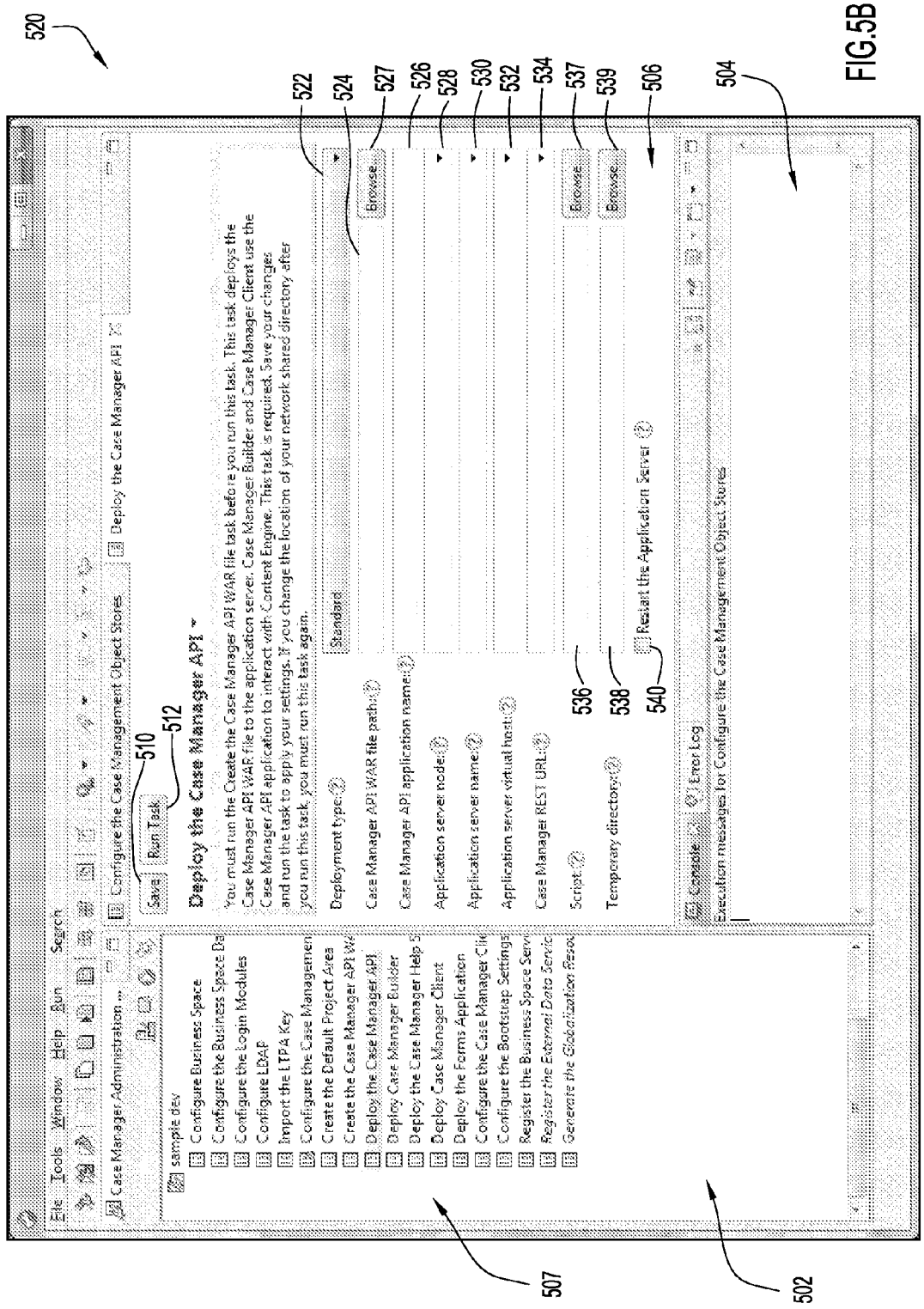
FIG. 5B is an example graphical user interface screen with information for a configuration profile pertaining to a standard implementation of a task according to an embodiment of the present invention.
Figure 5C:
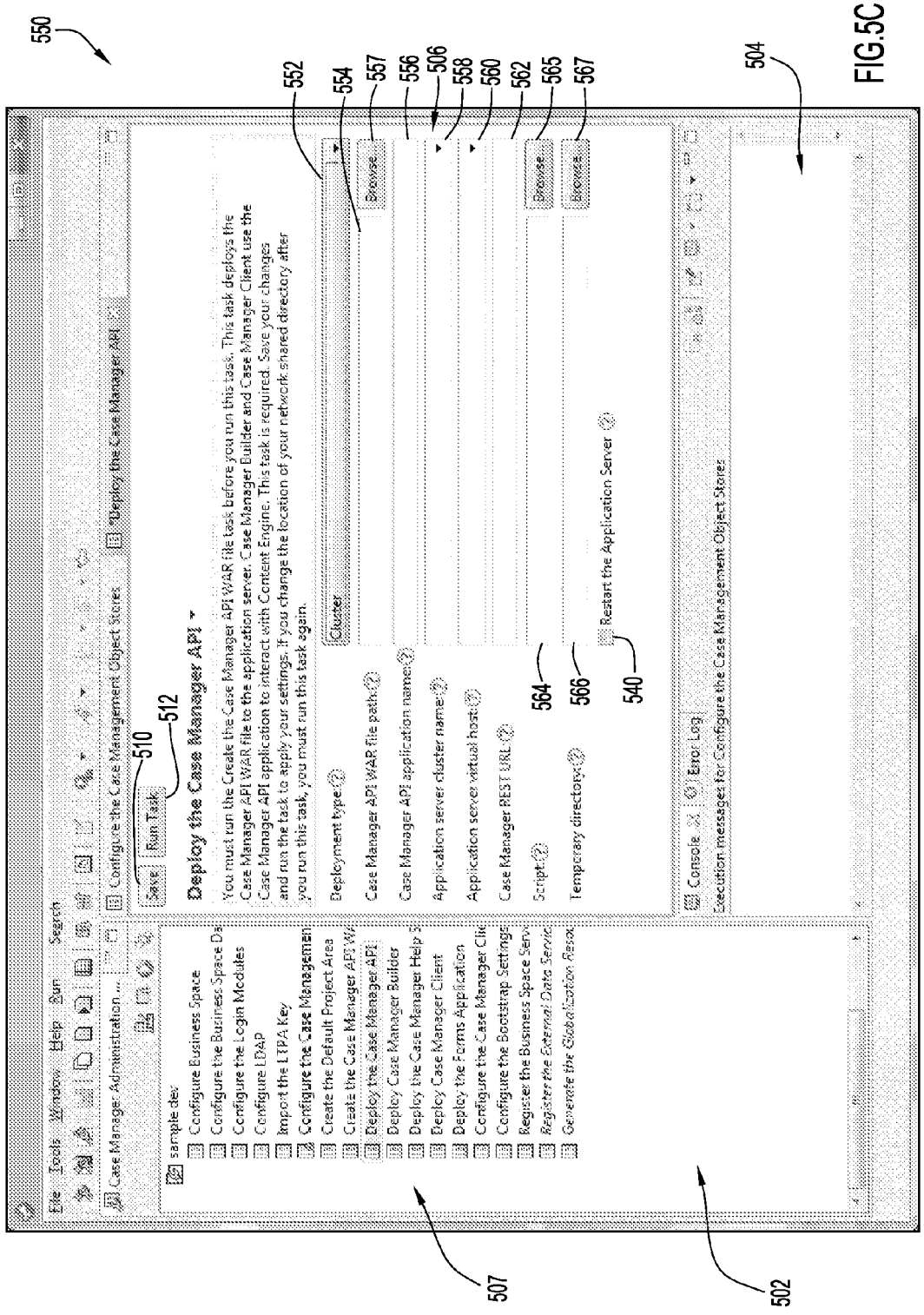
FIG. 5C is an example graphical user interface screen with information for a configuration profile pertaining to a cluster implementation of a task according to an embodiment of the present invention.

The configuration tool further manages tasks within a configuration profile, and enables movement of tasks within the configuration profile to change the order of task execution, editing of tasks, execution of tasks, checking of task status, enablement/disablement of a task, renaming of a task, copying a task, adding a new task, resetting a task status (e.g., deletion of the status file), and deleting a task. A manner of managing tasks of an example configuration profile to configure software components of a software system (e.g., via the configuration tool of application server system 100 and configuration module 150) is illustrated in FIGS. 5A-5C. Initially, individual tasks may be managed via task management user interface screen 500 (FIG. 5A). This screen is initiated from the configuration tool and provides information for a newly created or existing configuration profile (e.g., "sample dev" as viewed in FIG. 5A). The selection of a configuration profile may be accomplished via a file or other drop-down menu (e.g., including an open operation) on task management screen 500, or a user interface (e.g., user interface screen, command line prompt, or other interface mechanism) enabling a user to select a desired configuration profile.

In particular, task management screen 500 includes a task area 502, a task status area 504, and a task information area 506. In addition, task management screen 500 includes a save actuator 510 to save information for a selected task, and a run task actuator 512 to execute a selected task. Save actuator 510 and run task actuator 512 are disposed toward an upper portion of task management screen 500. Task area 502 displays a list of tasks 507 of the selected configuration profile. By way of example only, task management screen 500 includes information pertaining to a "sample dev" configuration profile and a selected "Configure the Case Management Object Stores" task, where this example configuration profile and associated tasks pertain to IBM Configuration Manager for Content Engine Server and IBM Case Manager products. However, the task management screen may be utilized for and include information pertaining to any desired configuration profile, corresponding tasks, and software products.

A task may be selected from task list 507 (e.g., via actuation of a mouse or other input device) for processing. Task status area 504 provides a status for a selected task, while task information area 506 provides information for a selected task. Task information area 506 may vary, and provides information associated with a task selected from task list 507. For example, information area 506 of task management screen 500 includes an object store display name field 514 preferably in the form of a drop-down list and associated with information pertaining to a display name for a target object store associated with the selected "Configure the Case Management Object Stores" task (e.g., as viewed in FIG. 5A).

Task management screen 500 enables various operations to be performed for a selected task. For example, the task management screen enables movement of tasks within the configuration profile to change the order of task execution, editing of tasks, execution of tasks, checking of task status, enablement/disablement of a task, renaming of a task, copying a task, adding a new task, resetting a task status (e.g., deletion of the status file), and deleting a task. These various operations may be initiated from an operations menu 508 displayed in response to selection of a task from task list 507 (e.g., the selection of a task and presentation of the operations menu may be accomplished via actuation of a mouse or other input device). Thus, specific portions of a configuration profile may be edited at any point without needing to traverse a series of interface screens or prompts in a wizard type fashion.

The tasks within task list 507 may perform various operations. For example, a task may facilitate a type of deployment, where the deployment type may be specified within the configuration tool. Initially, a task facilitating deployment may be selected from task list 507 of task management screen 500 as described above. The selected task may be processed to specify deployment information via actuation of a mouse (e.g., double click or other operation) or selection from operations menu 508 (e.g., selection of "Edit Selected Task" as viewed in FIG. 5A). Once a task is selected for processing, a task management screen 520 (FIG. 5B) is displayed. Task management screen 520 is substantially similar to the task management screen described above with task information area 506 including information pertaining to the selected task. By way of example only, task management screen 520 pertains to a selected "Deploy the Case Manager API" task specified to facilitate a standard type deployment. However, task management screen 520 may be utilized for and include information pertaining to any desired tasks and deployments.

In particular, task management screen 520 includes task area 502 with list of tasks 507, and task status area 504 each as described above. Task management screen 520 further includes information area 506 including one or more fields pertaining to the selected task (e.g., "Deploy the Case Manager API" task) and for specifying information pertaining to the task deployment. In addition, task management screen 520 includes save actuator 510 to save information for the selected task, and run task actuator 512 to execute the selected task as described above. Save actuator 510 and run task actuator 512 are disposed toward an upper portion of task management screen 520.

Information area 506 includes fields to receive information from a user pertaining to the task and type of deployment. By way of example, information area 506 includes a deployment type field 522, a file path field 524 with an adjacent browse actuator 527 to enable graphical selection of a file path for this field, an application name field 526, an application server node field 528, an application server name field 530, an application server virtual host field 532, a representational state transfer (REST) uniform resource locator (URL) field 534, a script field 536 with an adjacent browse actuator 537 to enable graphical selection of a location of the desired script, and a temporary directory field 538 with an adjacent browse actuator 539 to enable graphical selection of a directory for this field. In addition, task deployment screen 520 includes a restart actuator 540 (e.g., a check box) to enable a restart of the application server system.

Deployment type field 522 is associated with information pertaining to the type of deployment to be provided by the selected task (e.g., a standard deployment as viewed in FIG. 5B) and is preferably in the form of a drop-down list. File path field 524 is associated with information pertaining to a file path for an application programming interface (API) of a web application archive (WAR) file. Application name field 526 is associated with information pertaining to an application name corresponding to an application programming interface (API). Application server node, name and virtual host fields 528, 530, and 532 are preferably in the form of drop-down lists and are respectively associated with information pertaining to the server node, name and virtual host of the application server system. Representational state transfer (REST) uniform resource locator (URL) field 534 is preferably in the form of a drop-down list and is associated with the uniform resource locator (URL) of a representational state transfer (REST) protocol, while script field 536 is associated with information pertaining to the location of a script file performing the task. Temporary directory field 538 is associated with information pertaining to a temporary directory.

Once the information is received in information area 506 from a user for the selected task, save actuator 510 is actuated to store the information. The configuration tool preferably saves the information received from a user for each of these fields as text to construct and/or modify the task property file (FIG. 2B) associated with the configuration profile.

In the case of a selected task facilitating a cluster type deployment, information may be specified within the configuration tool via a task management screen 550 (FIG. 5C). Initially, a task facilitating deployment may be selected from task list 507 of task management screen 500 as described above. The selected task may be processed to provide deployment information via actuation of a mouse (e.g., double click or other operation) or selection from operations menu 508 (e.g., selection of "Edit Selected Task" as viewed in FIG. 5A). Once a task is selected for processing, task management screen 550 (FIG. 5C) is displayed. Task management screen 550 is substantially similar to the task management screens described above with task information area 506 including information pertaining to the selected task. By way of example only, task management screen 550 pertains to a selected "Deploy the Case Manager API" task specified to facilitate a cluster type deployment. However, task management screen 550 may be utilized for and include information pertaining to any desired tasks and deployments.

In particular, task management screen 550 includes task area 502 with task list 507, and task status area 504 each as described above. Task management screen 550 further includes information area 506 including one or more fields pertaining to the selected task (e.g., "Deploy the Case Manager API" task) and for specifying information pertaining to the task deployment. In addition, screen 550 includes save actuator 510 to save information for a selected task, and run task actuator 512 to execute a selected task as described above. Save actuator 510 and run task actuator 512 are disposed toward an upper portion of task management screen 550.

By way of example, information area 506 includes a deployment type field 552, a file path field 554 with an adjacent browse actuator 557 to enable graphical selection of a file path for this field, an application name field 556, an application server cluster name field 558, an application server virtual host field 560, a representational state transfer (REST) uniform resource locator (URL) field 562, a script field 564 with an adjacent browse actuator 565 to enable graphical selection of a location of the desired script, and a temporary directory field 566 with an adjacent browse actuator 567 to enable graphical selection of a directory for this field. In addition, task management screen 550 includes a restart actuator 540 (e.g., a check box) to enable a restart of the application server system.

Deployment type field 552 is preferably in the form of a drop-down list and is associated with information pertaining to the type of deployment to be provided by the selected task (e.g., a cluster deployment as viewed in FIG. 5C). File path field 554 is associated with information pertaining to a file path of an application programming interface (API) for a web application archive (WAR) file. Application name field 556 is associated with information pertaining to an application name for an application programming interface (API). Application server cluster name and virtual host fields 558, 560 are preferably in the form of drop-down lists and are respectively associated with information pertaining to the server cluster name and virtual host of the application server system. Representational state transfer (REST) uniform resource locator (URL) field 562 is associated with information pertaining to the uniform resource locator (URL) of a representational state transfer (REST) protocol, while script field 564 is associated with information pertaining to the location of a script file performing the task. Temporary directory field 566 is associated with information pertaining to a temporary directory.

Once the information is received in information area 506 from a user for the selected task, save actuator 510 is actuated to store the information. The configuration tool preferably saves the information received from a user for each of these fields as text to construct and/or modify the task property file (FIG. 2B) associated with the configuration profile.

Since the deployment type is a dynamic task property, this task property is not listed in the task property file. This task property controls the implementation type of the task (e.g., and adjusts the implementor identification field of the task property file (e.g., between standard, network, and cluster) in accordance with the desired implementation type). Plural dynamic properties may further control the implementation type of the task.

Figure 6A:
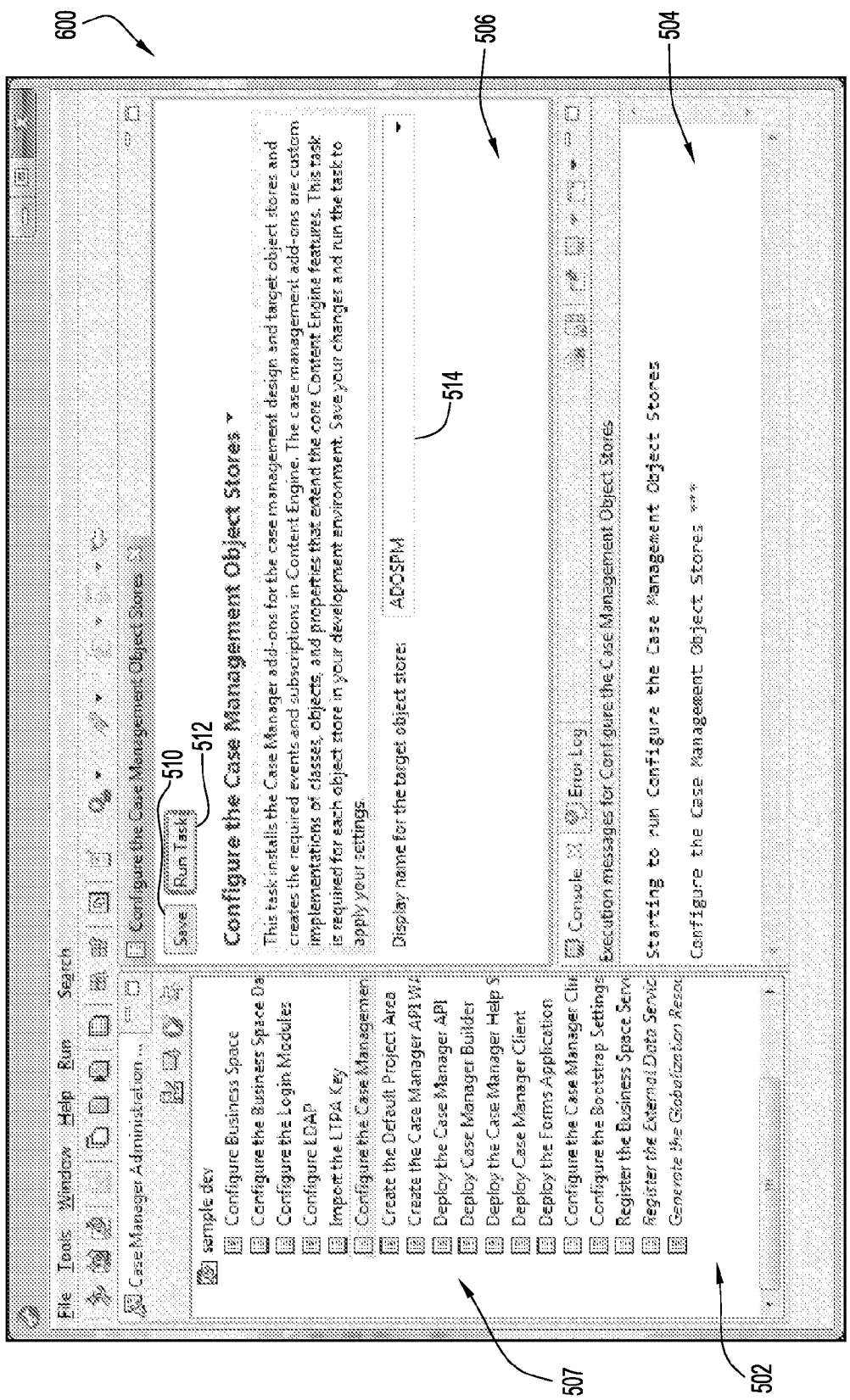
FIG. 6A is an illustration of an example graphical user interface with information pertaining to execution of tasks of a configuration profile according to an embodiment of the present invention.
Figure 6B:
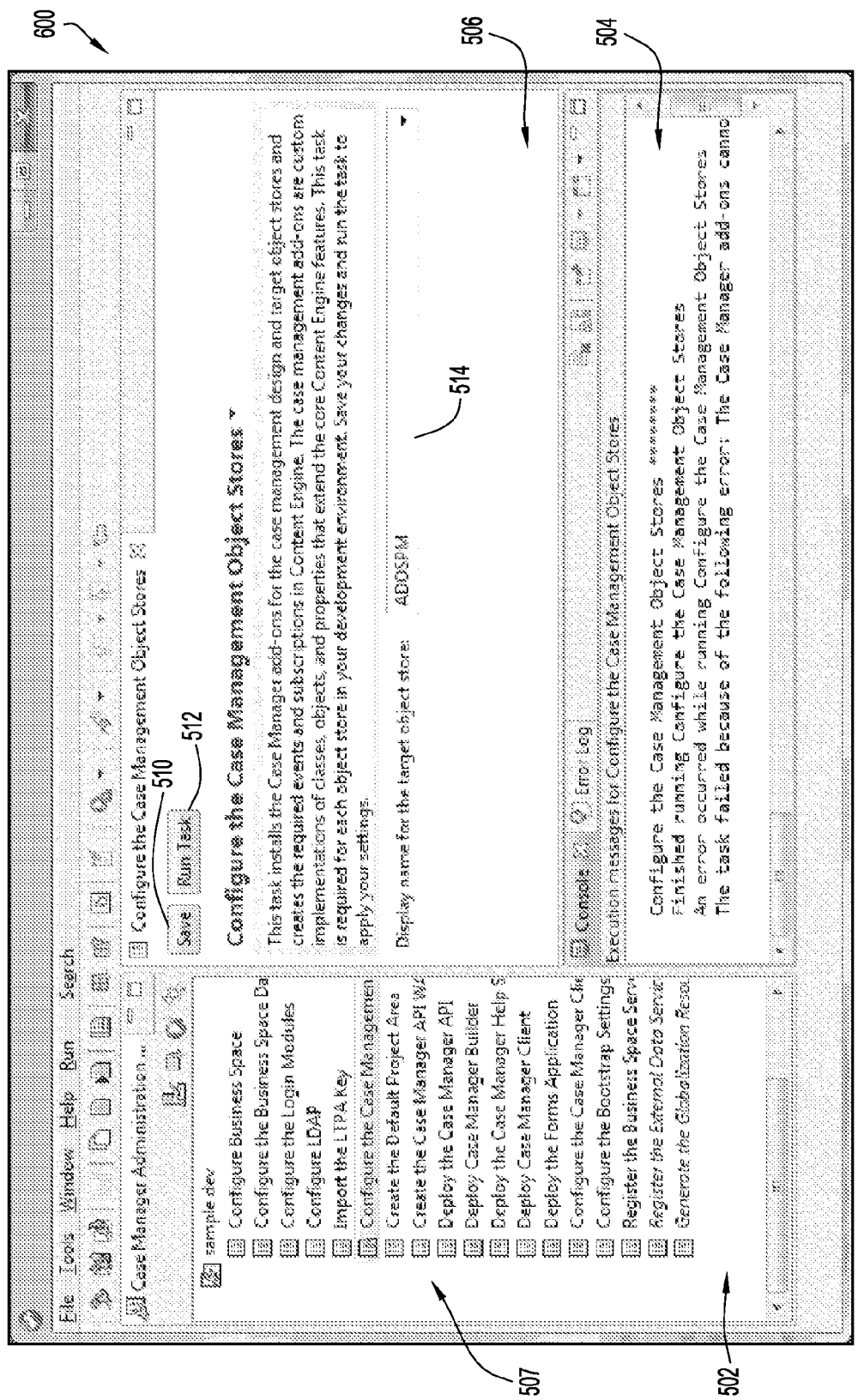
FIG. 6B is an illustration of the example graphical user interface screen of FIG. 6A with information pertaining to a failed task of a configuration profile according to an embodiment of the present invention.
Figure 6C:
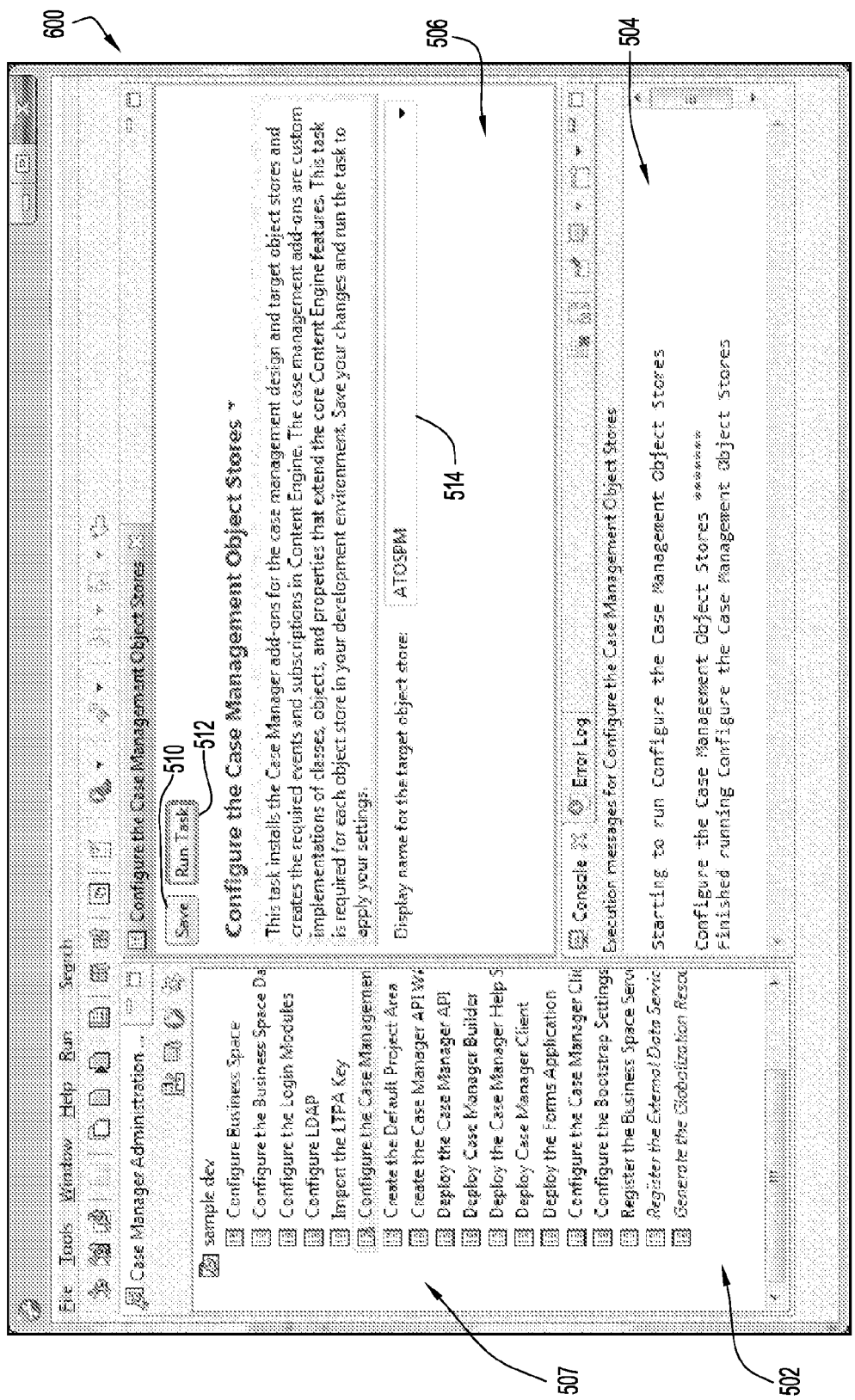
FIG. 6C is an illustration of the example graphical user interface screen of FIG. 6A with information pertaining to successful execution of a task of a configuration profile according to an embodiment of the present invention.

Once a configuration profile and corresponding tasks have been created, the tasks may be executed to configure the software system. The configuration tool enables execution and monitoring of tasks as illustrated in FIGS. 6A-6C. Initially, a task may be selected from task list 507 of task management screen 500 as described above. Once a task is selected for execution, a task management screen 600 (FIG. 6A) is displayed. Task management screen 600 is substantially similar to task management screen 500 described above, and includes task area 502 with task list 507, and task status area 504 each as described above. Task management screen 600 further includes information area 506 that includes information pertaining to the selected task. In addition, task management screen 600 includes save actuator 510 to save information for a selected task, and run task actuator 512 to execute a selected task as described above. Save actuator 510 and run task actuator 512 are disposed toward an upper portion of task management screen 600.

Task status area 504 provides status for a selected task, while information area 506 provides information for a selected task. For example, information area 506 includes an object store display name field 514 to receive information pertaining to a display name for a target object store associated with the selected "Configure the Case Management Object Stores" task (e.g., as viewed in FIG. 6A).

Once a task is selected, the selected task may be executed via actuation of run task actuator 512 or an execute operation selected from operations menu 508 (e.g., "Run Task" as viewed in FIG. 5A). Task status area 504 indicates the status of the executed task. For example, task status area 504 may provide a message indicating that: the selected task is executing (e.g., FIG. 6A), execution of the selected task failed and the reason for the failure (e.g., FIG. 6B), or execution of the selected task was successful (e.g., FIG. 6C).

Task management screen 600 further enables all or any portion of the tasks of a configuration profile to be executed and monitored in substantially the same manner described above. The execution of a configuration profile (e.g., including execution of all configuration profile tasks) may be accomplished via a drop-down menu (e.g., including an execute configuration profile operation) on task management screen 600. In this case, the tasks are executed in order and task status area 504 provides messages in accordance with each task execution in substantially the same manner described above. Alternatively, any quantity of tasks may be selected from task list 507 (e.g., via actuation of a mouse or other input device). The selected tasks are executed in order and task status area 504 provides messages in accordance with each task execution in substantially the same manner described above.

It will be appreciated that the embodiments described above and illustrated in the drawings represent only a few of the many ways of implementing embodiments for configuring a system with various system components utilizing a configuration profile.

The computing environment or system for the present invention embodiments may include any number of computer or other processing systems (e.g., client systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, configuration module, etc.). These systems may include any types of monitors and input devices (e.g., keyboard, mouse, voice recognition, etc.) to enter and/or view information. In addition, the computer systems may host any quantity of any physical or virtual servers.

It is to be understood that the software (e.g., configuration module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., configuration module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The computing environment or system may employ any number of any conventional or other databases, data stores or storage structures (e.g., files, databases, data structures, data or other repositories, etc.) to store any desired information (e.g., content, configuration files, task property files, profile property files, etc.). The database systems may be implemented by any number of any conventional or other databases, data stores or storage structures (e.g., files, databases, data structures, data or other repositories, etc.) to store any desired information. The database systems may be included within or coupled to the server and/or client systems. The database systems and/or storage structures may be remote from or local to the computer or other processing systems, and may store any desired data.

The configuration profile may be utilized to configure any quantity of system components to configure a system, and preferably configures two or more different system components. A system may be associated with any quantity of configuration profiles, each configuring the system for a different environment or mode of operation. Further, a configuration profile may be associated with and used to configure any quantity of systems. The system may include any quantity of any types of components (e.g., hardware components, software components, controlled mechanical components, etc.). The configuration profile may configure a system for any desired environment or operational mode (e.g., production environment, test environment, development environment, simulation, etc.).

The configuration profile may be associated with any quantity of files or other storage structures to store information for the configuration profile. The configuration profile may include any quantity of configuration files, task property files, and profile property files. The task property file may be associated with any quantity of tasks and/or configuration profiles, while the profile property file may be associated with any quantity of configuration profiles. The configuration file may be of any type (e.g., XML, text, etc.), format or arrangement, and include any quantity of any desired information (e.g., tasks, names, identifiers, etc.). The task property file may be of any type (e.g., XML, text, etc.), format or arrangement, and include any quantity of any desired information (e.g., tasks, names, identifiers, properties, values, etc.). The profile property file may be of any type (e.g., XML, text, etc.), format or arrangement, and include any quantity of any desired information (e.g., names, identifiers, properties, values, environments, etc.).

The files of a configuration profile (e.g., configuration file, task property file, profile property file, etc.) may be stored in any desired location areas (e.g., folder, directory, etc.), where these file may be stored within the same location area or dispersed among any quantity of different location areas (within the same or different storage systems). The fields of the configuration, task property, and profile property files may be of any quantity, type, or format (e.g., string, numeric, Boolean, etc.), and may include any desired information with any desired values. The enable flag may include any desired values to indicate enablement or disablement of a task or property (e.g., true, false, 1, 0, etc.).

The configuration tool of the present invention embodiments may employ any number of any type of user interface (e.g., Graphical User Interface (GUI), command-line, prompt, etc.) for obtaining or providing information, where the interface may include any information arranged in any fashion. The interface screens may include any number of any types of input or actuation mechanisms (e.g., buttons, icons, fields, boxes, links, drop-down menus or lists, etc.) disposed at any locations to enter/display information, select any quantity of desired entities (e.g., tasks, properties, etc.) and initiate desired actions via any suitable input devices (e.g., mouse, keyboard, etc.). The interface screens may include any suitable actuators (e.g., links, tabs, buttons, etc.) to navigate between the screens in any fashion. The fields of the interface screens may be of any quantity, type, or format (e.g., string, numeric, Boolean, etc.), and may include any desired information with any desired values. The configuration tool may dynamically determine values for the drop-down lists of the various interface screens based on known or ascertained information or information entered by a user. The report may include any information arranged in any fashion, and may be configurable based on rules or other criteria to provide desired information to a user.

The configuration profile and configuration tool of present invention embodiments are not limited to the specific tasks described above, but may be utilized to configure any type of system having any quantity of any types of various system components.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Generally, like reference numerals in the various figures are utilized to designate like components.

What is claimed is:

1. A computer-implemented method of configuring a system with at least two different system components based on a target computing environment comprising:
   generating a profile to configure each of the at least two different system components for the target computing environment, wherein the profile identifies a corresponding set of tasks to be performed and properties to configure each of the at least two different system components for the target computing environment, and wherein at least two of the corresponding sets of tasks are different, with each associated with a different type of server system;
   processing the profile and performing the corresponding set of tasks in the order listed in the profile and in accordance with the properties of the corresponding system component to configure each system component for the target computing environment; and
   installing each configured system component on the target computing environment.

2. The computer-implemented method of claim 1, wherein the target computing environment includes one of a development computing environment and a production computing environment.

3. The computer-implemented method of claim 1, wherein the profile includes:
   a configuration file identifying the profile and tasks to be performed to configure the different system components for the target computing environment; and
   one or more property files specifying the properties for corresponding system components for the target computing environment.

4. The computer-implemented of claim 3, wherein the configuration file and one or more property files include extensible markup language (XML) files.

5. The computer-implemented method of claim 3, wherein processing the profile further includes:
   performing the tasks in the order listed in the profile and in accordance with the properties specified by the corresponding property files for the system components to configure the system components for the target computing environment.

6. The computer-implemented method of claim 1, wherein the system includes a software system, and the system components include software components of the software system.

7. The computer-implemented method of claim 1, wherein generating a profile includes:
   generating a sub-profile for each of at least two different target computing environments, wherein each sub-profile identifies the corresponding tasks to be performed and properties to configure each of the different system components for a corresponding target computing environment; and
   wherein processing the profile further includes:
   processing the sub-profile associated with a desired target computing environment and performing the tasks in the order listed in that sub-profile and in accordance with the properties to configure the system for the desired target computing environment.

8. A computer system for configuring a system with at least two different system components based on a target computing environment comprising:
   at least one processor configured to:

generate a profile to configure each of the at least two different system components for the target computing environment, wherein the profile identifies a corresponding set of tasks to be performed and properties to configure each of the at least two different system components for the target computing environment, and wherein at least two of the corresponding sets of tasks are different, with each associated with a different type of server system;

process the profile and perform the corresponding set of tasks in the order listed in the profile and in accordance with the properties of the corresponding system component to configure each system component for the target computing environment; and install each configured system component on the target computing environment.

9. The computer system of claim 8, wherein the target computing environment includes one of a development computing environment and a production computing environment.

10. The computer system of claim 8, wherein the profile includes:
   a configuration file identifying the profile and tasks to be performed to configure the different system components for the target computing environment; and
   one or more property files specifying the properties for corresponding system components for the target computing environment.

11. The computer system of claim 10, wherein the configuration file and one or more property files include extensible markup language (XML) files.

12. The computer system of claim 10, wherein processing the profile further includes:
   performing the tasks in the order listed in the profile and in accordance with the properties specified by the corresponding property files for the system components to configure the system components for the target computing environment.

13. The computer system of claim 8, wherein the system includes a software system, and the system components include software components of the software system.

14. The computer system of claim 8, wherein generating a profile includes:
   generating a sub-profile for each of at least two different target computing environments, wherein each sub-profile identifies the corresponding tasks to be performed and properties to configure each of the different system components for a corresponding target computing environment; and
   wherein processing the profile further includes:
   processing the sub-profile associated with a desired target computing environment and performing the tasks in the order listed in that sub-profile and in accordance with the properties to configure the system for the desired target computing environment.

15. A computer program product for configuring a system with at least two different system components based on a target computing environment comprising:
   a non-transitory computer readable storage medium having computer readable program code embodied therewith, the computer readable program code comprising computer readable program code configured to:
   generate a profile to configure each of the at least two different system components for the target computing environment, wherein the profile identifies a corresponding set of tasks to be performed and properties to configure each of the at least two different system components for the target computing environment, and wherein at least two of the corresponding sets of tasks are different, with each associated with a different type of server system;
   process the profile and perform the corresponding set of tasks in the order listed in the profile and in accordance with the properties of the corresponding system component to configure each system component for the target computing environment; and
   install each configured system component on the target computing environment.

16. The computer program product of claim 15, wherein the target computing environment includes one of a development computing environment and a production computing environment.

17. The computer program product of claim 15, wherein the profile includes:
   a configuration file identifying the profile and tasks to be performed to configure the different system components for the target computing environment; and
   one or more property files specifying the properties for corresponding system components for the target computing environment.

18. The computer program product of claim 17, wherein the configuration file and one or more property files include extensible markup language (XML) files.

19. The computer program product of claim 17, wherein processing the profile further includes:
   performing the tasks in the order listed in the profile and in accordance with the properties specified by the corresponding property files for the system components to configure the system components for the target computing environment.

20. The computer program product of claim 15, wherein the system includes a software system, and the system components include software components of the software system.

21. The computer program product of claim 15, wherein generating a profile includes:
   generating a sub-profile for each of at least two different target computing environments, wherein each sub-profile identifies the corresponding tasks to be performed and properties to configure each of the different system components for a corresponding target computing environment; and
   wherein processing the profile further includes:
   processing the sub-profile associated with a desired target computing environment and performing the tasks in the order listed in that sub-profile and in accordance with the properties to configure the system for the desired target computing environment.

* * * * *